[11] 4,303,319
[45] Dec. 1, 1981

[54] UNIDIRECTIONAL FOCUSSING SYSTEM

[75] Inventors: August Hell, Feldkirchen; Istvan Cocron, Munich, both of Fed. Rep. of Germany

[73] Assignee: AGFA-Gevaert Aktiengesellschaft, Leverkusen, Fed. Rep. of Germany

[21] Appl. No.: 52,962

[22] Filed: Jun. 26, 1979

[30] Foreign Application Priority Data

Jun. 30, 1978 [DE] Fed. Rep. of Germany ....... 2828865

[51] Int. Cl.³ .............................................. G03B 3/10
[52] U.S. Cl. ........................................ 354/25; 354/31; 352/140
[58] Field of Search ................. 354/25, 31, 60 R, 195, 354/162, 163, 165, 168, 169, 25 A; 352/140; 355/56; 250/201, 204; 356/1, 4; 318/314, 624; 361/176, 177

[56] References Cited

U.S. PATENT DOCUMENTS

| | | | |
|---|---|---|---|
| 3,274,914 | 9/1966 | Biedermann et al. | 354/31 X |
| 3,617,128 | 11/1971 | Harvey | 356/4 |
| 3,906,389 | 9/1975 | Matsumoto et al. | 354/25 X |
| 4,053,240 | 11/1977 | Aizawa et al. | 354/25 X |
| 4,091,275 | 5/1978 | Wilwerding | 354/25 X |

*Primary Examiner*—L. T. Hix
*Assistant Examiner*—William B. Perkey
*Attorney, Agent, or Firm*—Michael J. Striker

[57] ABSTRACT

At the start of each focussing operation, the camera objective is at a first extreme subject-distance setting and is moved in a first direction therefrom towards the second extreme subject-distance setting. A focus-evaluating circuit comprises first and second photodetectors located to receive light from the subject and a comparing circuit which compares the light incident on the photodetectors and in dependence upon the present subject-distance setting generates first and second signals respectively indicating that the subject-distance setting should be changed in the first direction or in the opposite second direction, such circuit having bidirectional character and furthermore establishing a tolerance range of acceptable distance-setting error within which both the first and second signals are generated. During the unidirectional change of subject-distance setting, the appearance of the first signal leads to generation of a stop signal commanding that the progressive change of distance setting be stopped. Accordingly, the unidirectional change of setting is commanded to stop at the point where the changing distance setting just enters into the tolerance range of the bidirectional evaluating circuitry.

12 Claims, 6 Drawing Figures

UNIDIRECTIONAL FOCUSSING SYSTEM

BACKGROUND OF THE INVENTION

The present invention concerns automatic and semiautomatic focussing systems for photographic still and motion-picture cameras.

In particular, the present invention concerns automatic and semiautomatic focussing systems of the unidirectional type. In a unidirectional automatic focussing system, the subject-distance setting of the camera objective is always at one of the two extremes of the total subject-distance range at the start of a focussing operation, e.g., at minimum subject-distance setting, and then is moved by a drive spring or electric drive motor towards the other extreme setting, the change of subject-distance setting being discontinued when the correct subject-distance setting has been reached. In such unidirectional automatic focussing systems, the drive used for the objective, whether a drive spring or an electric motor, does not adjust the subject-distance setting bidirectionally, but instead always, as just stated, proceeding from one extreme setting to the correct setting. Even when the focussing system is provided with an adjusting motor of bidirectional operation, a switchover to what is in effect unidirectional operation may be implemented. For example, commonly owned copending application Ser. No. 20,240 filed Mar. 13, 1979, now U.S. Pat. No. 4,265,528, discloses a system in which the subject-distance setting is automatically returned to an extreme value at the end of each exposure or series of exposures; accordingly, that system, too, operates essentially unidirectionally. Indeed, an automatic return to an extreme subject-distance setting can be performed even in systems where the subject-distance setting is manually adjusted; in that event, as the user moves the camera objective from one extreme setting towards the other extreme setting, an indicator lamp can light up, or the like, to command termination of the unidirectional movement.

For various reasons, in automatic unidirectional focussing systems, the circuitry used to ascertain the correct subject-distance setting has been mainly of the travel-time measurement type, involving measurement of the time of travel of radiation emitted from the camera to the subject, and reflected from the subject back to the camera.

SUMMARY OF THE INVENTION

It is a general object of the present invention to provide such an automatic or semiautomatic unidirectional focussing system in which ascertainment of correct subject-distance setting is performed without resort to travel-time measurement.

It is a more specific object, in this connection, to utilize a control circuit of the type comprising first and second photodetector means located to receive light from the subject to be photographed, and provided with comparing circuit means operative for comparing the amounts of light incident on the first and second photodetector means, but with the comparing circuit means being operative in dependence upon the present subject-distance setting for generating first and second signals respectively indicating that the subject-distance setting should be changed in a first direction from the first extreme setting towards the second extreme setting and that the subject-distance setting should be changed in the opposite second direction.

Such a circuit is bidirectional in character and could be used to control a bidirectional or reversible electric adjusting motor, although that is not done in the present invention which concerns unidirectional systems exclusively. Indeed, bidirectional focus-evaluating circuits, besides generating first and second signals commanding adjustment in respective opposite directions, may have a bidirectional tolerance range, centered about the nominally perfect value of focus, in order to prevent hunting in a bidirectional system. Accordingly, the use of a truly bidirectional control circuit, especially one provided with a bidirectional tolerance range, seems inherently unfit for use in a unidirectional system. However, in accordance with the present invention, it has been realized, first, that such a bidirectional control circuit can operatively be used in an exclusively unidirectional system, and that indeed some of the bidirectional characteristics of the control circuit can be of positive and unexpected utility in a unidirectional system.

In addition to the fact that such a bidirectional control circuit can be used at all for control of such a unidirectional system, there is the positive advantage that one and the same control circuit is potentially capable of controlling either a unidirectional system of the type which always starts at minimum subject-distance setting or else, equally well, a unidirectional system which always starts at maximum subject-distance setting. In either case, a stop signal is derived from that one of the control circuit's two output signals which would, in the case of a bidirectional system, command adjustment in the direction opposite to the direction exclusively employed in the relevant unidirectional focussing system.

If the bidirectional control circuit is designed to include a bidirectional tolerance range—a feature which seems particularly unfit for use in a unidirectional system—unexpected advantages result. Thus, with a bidirectional tolerance range having first and second tolerance-range limits (the first nearer the first extreme distance setting, the second nearer the second extreme setting), the stop signal can be derived from the signal which anyway indicates that the present subject-distance setting has just crossed the first tolerance- range limit value and just entered into the bidirectional tolerance range. Although it would seem that, in a unidirectional system, the stop signal should be generated nearer the center of the bidirectional tolerance range, this proves not to be actually necessary, partly because the half of the bidirectional tolerance range employed does, after all, correspond to acceptable error in the subject-distance setting. Additionally, however, if the unidirectional system is automatic, i.e., employs a drive spring mechanism or an electric motor, the time required for the subject-distance-setting adjustment to come to a stop in response to the stop signal will often be non-negligible, so that generation of the stop signal in response to crossing of the nearer limit of the bidirectional tolerance range may be positively appropriate, to gain lead time and facilitate actual termination of the adjustment near the middle of the bidirectional tolerance range. In general, when the drive mechanism employed exhibits non-negligible stopping time, especially in the case of spring-powered drive mechanisms, the stopping time, although non-negligible, will be short enough that the distance-setting adjustment will actually terminate before the subject-distance setting can reach the second or farther tolerance-range limit and leave the bidirectional tolerance range.

Thus, for example, with a bidirectional tolerance range, the bidirectional control circuit will often be so designed that: the first signal, commanding first-direction adjustment, will be generated when first-direction adjustment is needed to bring the subject-distance setting into the bidirectional tolerance range; the second signal, commanding opposite- or second-direction adjustment, will be generated when second-direction adjustment is needed to bring the subject-distance setting into the bidirectional tolerance range; and both the first and second signal will be generated when the present subject-distance setting is within the bidirectional tolerance range. Thus, despite reliance upon the second-direction signal produced by a bidirectional control circuit having a bidirectional tolerance range, the stop signal is positively generated at the nearer or first limit of the tolerance range, and the adjustment does not actually continue to the point where, in a comparable bidirectional system, a true second-direction corrective command would be generated.

Here again, i.e., with the presence of a bidirectional tolerance range being now positively exploited, there is the additional advantage that this mode of operation can be achieved, using one and the same circuit, both for unidirectional systems which start always at the minimum distance setting and for those which start always at the maximum distance setting.

Another advantage of the inventive use of a bidirectional control circuit for a unidirectional focussing system resides in the purely economic possibility of being able to use the selfsame control circuit, even in some instances with no modifications of any kind, to alternatively control other focussing systems of actually bidirectional operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4a depicts a detail of the mechanical part of such system;

DESCRIPTION OF THE PREFERRED EMBODIMENTS

Figure 1:
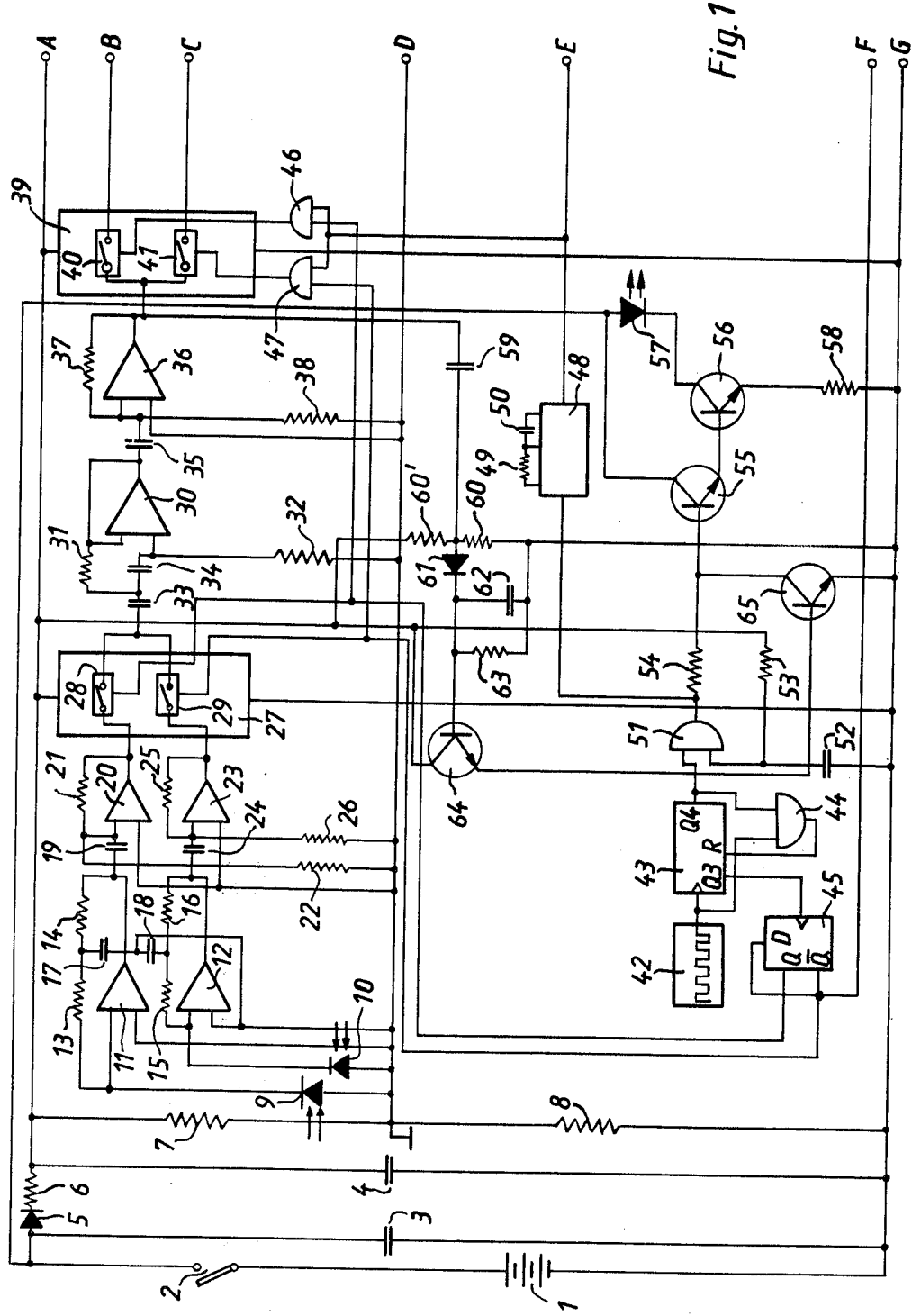
FIGS. 1 and 2 depict a bidirectional focus-control circuit used in a unidirectional focussing system in accordance with the present invention.

In FIG. 1, numeral 1 denotes a battery connectable via a power-connect switch 2 to the remainder of the illustrated circuitry. Two capacitors 3, 4, a diode 5 and a resistor 6, together serve to derive from the battery voltage a stabilized operating voltage furnished on line A. Two equal-value resistors 7, 8 connected across the operating voltage establish a midway ground potential for parts of the illustrated circuitry. An infrared-responsive receiver system includes two infrared-responsive diodes 9, 10. In a manner described, for example, in commonly owned copending application Ser. No. 5,091, filed Jan. 22, 1979, now U.S. Pat. No. 4,221,474, the entire disclosure of which is incorporated herein by reference, the two photodiodes 9, 10 are located side by side in the path of an infrared-light beam reflected back towards the camera from a subject towards which an infrared beam is emitted by the camera's focussing system; if the camera's state of focus is correct, the reflected back beam is incident on the two photodiodes equally, if too short then incident more or exclusively on one photodiode, if too long then incident more or exclusively on the other photodiode. Infrared photodiode 9 is connected to the inverting input of an operational amplifier 11, whose non-inverting input is connected to ground. Photodiode 10 is connected to the inverting input of an operational amplifier 12, whose non-inverting input is connected to ground.

The feedback branch of each operational amplifier 11 or 12 comprises two resistors 13, 14 or 15, 16, serving to establish the D.C. signal component gain of the amplifiers. The taps between resistors 13 and 14, and 15 and 16, are connected to ground via respective capacitors 17 and 18. As a result, the A.C. signal component gain of the amplifiers is made frequency-dependent, increasing with increasing frequency. The resistors 13 and 14 are preferably equal in value to resistors 15 and 16; the same applies to the two capacitors 17 and 18.

The illustrated system has two signal transmission paths, the first associated with photodiode 9, the second with photodiode 10. The first signal transmission path comprises a coupling capacitor 19 connecting the output of operational amplifier 11 to the inverting input of an operational amplifier 20, in whose feedback branch is connected a resistor 21 which together with a resistor 22 sets the gain of amplifier 20. Operational amplifier 20 operates as an A. C. voltage amplifier. The second signal transmission path likewise comprises a coupling capacitor 24 connecting the output of operational amplifier 12 to the inverting input of an operational amplifier 23, whose feedback branch comprises a resistor 25 which together with a resistor 26 sets the gain of amplifier 23; amplifier 23, likewise, operates as an A.C. voltage amplifier.

Both signal transmission paths feed into a first multiplexer 27, comprised of two switching stages 28 and 29. Multiplexer 27 has two outputs connected in common to a high-pass filter comprised of an operational amplifier 30, resistors 31, 32 and capacitors 33, 34. Highpass filter 30–34 is designed to suppress interference voltages having frequencies equal to or twice the local mains frequency, in order that the system not be responsive to artificial lighting sources flickering at or at twice the local mains frequency.

High-pass filter 30–34 is connected via a coupling capacitor 35 to an A.C. voltage amplifier comprised of an operational amplifier 36 with gain-establishing resistors 37 and 38.

A second multiplexer 39 comprises two switching stages 40, 41 whose inputs are connected in common to the output of A.C. voltage amplifier 36–38. The outputs of the two switching stages 40, 41 are connected to respective terminals B and C.

A pulse generator 42 is connected to the counting input of a counter 43 operative as a timer for the illustrated circuitry. The output of pulse generator 42 and an output Q4 of counter 43 are connected to respective inputs of an AND-gate 44, whose output is connected to the reset input R of counter 43. An output Q3 of counter 43 is connected to the clock input of a D-flip-flop 45, whose D-input is connected to its own $\overline{Q}$ output.

The Q-output of flip-flop 45 is connected to the control input of the switching stage 28 within first multiplexer 27 and also to left input of an AND-gate 46. The $\overline{Q}$-output of flip-flop 45 is connected to the control input of switching stage 29 of first multiplexer 27 and also to the left input of an AND-gate 47. The right inputs of the two AND-gates 46, 47 are connected in common to the output of an adjustable time-delay stage 48–50, whose time-constant-determining resistor 49 and capacitor 50 are shown externally connected. The input of time-delay stage 48–50 is connected to the output of an AND-gate 51, whose upper input is connected to output Q4 of counter 43, and whose lower input is connected to the output of a time-delay stage comprised of a capacitor 52 and a resistor 53. The output of AND-gate 51 is furthermore connected via a resistor 54 to the base of a transistor 55 whose emitter is connected to the base of a further transistor 56, the collector circuits of the two transistors 55, 56 containing an infrared-emissive transmitter diode 57, operative when subjected to pulsed energization for emitting a pulsed infrared beam from the focussing system towards the subject, for reflection from the subject back onto the photodetector arrangement 9, 10. Numeral 58 denotes the emitter resistor of transistor 56.

The output of AND-gate 46 is connected to the control input of the switching stage 40 within second multiflexer 39, and the output of AND-gate 47 to the control input of switching stage 41.

The power of the infrared energy incident upon photo-detector arrangement 9, 10 is automatically regulated in the illustrated embodiment by automatic adjustment of the level of energization of infrared transmitter diode 57. In particular, the output of A.C. voltage amplifier 36, at which appears a signal whose amplitude tends inherently to be dependent upon the camera-to-subject distance, is connected via a capacitor 59 to the tap of a voltage divider 60, 60' connected across the operating voltage line A. Connected to the tap of voltage divider 60, 60' is a charging diode 61 which charges a capacitor 62 across which is connected a bleedoff resistor 63. Capacitor 62 is connected to the base of a transistor 64 whose collector is connected to operating voltage line A and whose emitter is connected to the base of a further transistor 65. The collector of transistor 65 is connected to the base of transistor 55. Infrared-emissive diode 57 is energized when a "1" signal appears at the output of AND-gate 51, the resistor 54 and the controllable collector-emitter resistance of transistor 65 being connected across the output of AND-gate 51 and acting as a voltage divider whose tap is connected to the base of transistor 55. When the camera-to-subject distance is low, the amplitude of the signal produced at the output of A.C. voltage amplifier 36 is high, capacitor 62 charges to a relatively high voltage, increasing the emitter current of transistor 64, thereby decreasing the collector-emitter resistance of transistor 65, thereby lowering the fraction of the output voltage of AND-gate 51 actually applied to the base of transistor 55, as a result of which the energizing current flowing through infrared-emissive diode 57 tends to decrease. Conversely, if the camera-to-subject distance is long, the energizing current flowing through infrared-emissive diode 57 assumes a higher value. Accordingly, the power level of the signals produced by the photo-detector arrangement 9, 10 is negative-feedback regulated, by automatic control of the level of radiant power emitted from transmitter diode 57. For longer camera-to-subject distances, higher radiant power is emitted, and for shorter distances lower power. This negative-feedback regulation of the received-back radiant power can be such that the level of radiant power emitted varies inversely to true camera-to-subject distance throughout the entire range of distances in which the focussing system is to be operated; this is implemented by designing the negative-feedback regulating stage such that the collector-emitter resistance of transistor 65 varies within its operative range for the range of photodiode-signal amplitude levels associated with the system's operative range of distances. Alternatively, the negative-feedback regulation can be so designed as to mainly effect a more or less abrupt cut-down or limiting of emitted radiant power for close-up contexts, by designing the regulator such that transistor 65 begins to lower the energization level of transmitting diode 57 only when the signal derived from photodetector arrangement 9, 10 begins to exhibit high values associated with short camera-to-subject distances.

The output of second-multiplexer switching stage 40 is connected via terminal B to a first integrator (see FIG. 2) comprised of an operational amplifier 66 provided with an integrating capacitor 67 in its negative-feedback branch and an input resistor 68. The output of integrator 66–68 is connected to the input of a voltage comparator comprised of an operational amplifier 69 whose non-inverting input is connected to the tap of a voltage divider 70, 71 connected between operating voltage line A and ground line D. Numeral 72 denotes a load resistor. The collector of a transistor 73 is connected to the output of integrator 66–68 and its emitter to ground line D; when transistor 73 is rendered conductive, it serves to discharge integrating capacitor 67 and thereby reset integrator 66–68.

The output of voltage comparator 69–72 is connected to the upper input of an AND-gate 74. The output of AND-gate 74 is connected to the clock input of a D flip-flop 75 whose D-input is connected to the operating voltage line A. The reset input R of D-flip-flop 75 is connected to an intermediate point of a time-delay chain comprised of gates 76, 77, resistors 78, 79 and capacitors 80 and 81. The base of transistor 73 is connected via a resistor 82 to the same intermediate point of time-delay chain 76–81, namely to the output of gate 76. The input of time-delay chain 76–81 is connected to the output of Qm of a cycle counter 83 whose reset input R is connected to the output of the time-delay chain. The counting input of counter 83 is connected via a terminal E to the output of adjustable time-delay stage 48–50.

The output Qm of cycle counter 83 is connected to the clock input of a D-flip-flop 84 whose D-input is connected to the Q-output of D-flip-flop 75.

Additionally, the output Qm of cycle counter 83 is connected to the reset input R of a tolerance-range counter 85, discussed in detail below.

The output of switching stage 41 of second multiplexer 39 is connected via a terminal C to a second integrator comprised of an operational amplifier 86, an integrating capacitor 87 and a resistor 88, resistor 88 being connected to the inverting input of the operational amplifier, and the non-inverting input being connected to ground line D. The two integrators 66–68 and 86–88 are preferably as nearly identical as possible. The output of second integrator 86–88 is connected to a second voltage comparator comprised of an operational amplifier 89, a voltage divider 90, 91 and a load resistor 92. Second voltage comparator 89–92 has the same threshold voltage value as first voltage comparator 69–72. Voltage divider 90, 91, like 70, 71 is connected between operating voltage line A and ground line D, with its tap connected to the non-inverting input of its respective operational amplifier 89. The output of operational amplifier 86 is connected to the collector of a transistor 93 whose emitter is connected to ground line D; when transistor 93 is rendered conductive, this serves to discharge integrating capacitor 87 and thereby reset second integrator 86–88. The base of transistor 93 is connected via a resistor 94 to the output of gate 76 of time-delay chain 76–81.

The output of operational amplifier 89 is connected to the upper input of an AND-gate 95, whose output is connected to the clock input of a D-flip-flop 96, the reset input R of which is connected to the intermediate point of time-delay chain 76–81. The Q-output of D-flip-flop 96 is connected to the D-input of a further D-flip-flop 97 whose clock input is connected to output Qm of cycle counter 83. The Q-outputs of flip-flops 75 and 96 are additionally connected to respective inputs of an OR-gate 98, whose output is connected to the upper input of an AND-gate 99. The middle input of AND-gate 99 is connected via a terminal F to the $\overline{Q}$ output of D-flip-flop 45 (FIG. 1). The lower input of AND-gate 99 is connected to the output of an inverter 100 whose input is connected to the output Qn of tolerance-range counter 85. The output of inverter 100 is additionally connected to the lower input of the two AND-gates 74, 95, already mentioned.

The Q-output of flip-flop 84 is connected to the upper input of an OR-gate 101, whose lower input is connected to the Q-output of flip-flop 97.

The Q-output of flip-flop 97 is connected to the upper input of an OR-gate 106, whose lower input is connected via a resistor 112 to the negative battery terminal line G.

The part of the illustrated circuitry shown in FIGS. 1 and 2 operates as follows:

When power-connect switch 2 is closed, a time delay established by time-delay stage 52, 53 elapses before an enabling "1" signal is applied to the lower input of AND-gate 51. This precludes energization of infrared-emissive diode 57, until after the elapse of a warm-up interval sufficient for pulse generator 42 to reach and stabilize at its designed frequency.

After AND-gate 51 has thusly become enabled, it produces an output "1" signal, resulting in energization of transmitter diode 57, once per counting cycle of counter 43. In response to predetermined numbers of pulses received from pulse generator 42, counter 43 produces a "1" signal on its output Q3 and thereafter a "1" signal on its output Q4, in response to which latter the "1" signal is produced at the output of AND-gate 51. After one such cycle of operation counter 43 resets.

During one operating cycle of counter 43, the "1" signal produced at its output Q3 causes a "1" signal to appear at the Q-output of D-flip-flop 45; during the next operating cycle of counter 43, the "1" signal produced at output Q3 causes such "1" signal to skip over to the $\overline{Q}$-output of flip-flop 45; and so forth, proceeding in alternation. As a result, during one cycle of operation of counter 43, first-multiplexer switching stage 28 and second-multiplexer switching stage 40 are rendered conductive, for transmission of the signal from infrared-responsive photodiode 9 through the first signal transmission path, including the signal-processing stages 30–38 shared by both signal transmission paths, to the first integrator 66–68. During the next cycle of operation of counter 43, first-multiplexer switching stage 29 and second-multiplexer switching stage 41 are rendered conductive, for transmission of the signal from photodiode 10 through the second signal transmission path, including shared signal-processing stages 30–38, to second integrator 86–88. And so forth, the transmission of the signals from first and second photodiode 9, 10 occurring alternately, during alternate respective cycles of operation of counter 43.

If the camera's present subject-distance setting is exactly correct, the reflected-back infrared radiation incident on photodetector arrangement 9, 10 is incident on both photodiodes 9 and 10 equally; if the present subject-distance setting is shorter than the true subject distance, the reflected-back beam is incident more on or exclusively on one of the two photodiodes 9, 10, depending upon the extent to which the present setting is too short; if the present subject-distance setting is longer than the true subject distance, the reflected-back beam is incident more on or exclusively on the other of the two photodiodes 9, 10, depending upon the extent to which the present setting is too long.

During one cycle of operation, the first integrator 66–68 integrates the processed signal derived from first photodiode 9, along with noise unavoidably present in the signal furnished by the photodiode per se and in the first signal transmission path in general. This integration continues for as long as the first switching stage 40 of second multiplexer 39 remains conductive. Advantageously, switching stage 40 is rendered conductive somewhat after the first switching stage 28 of first multiplexer 27, in order to allow the signal-processing circuitry to fully react to the signal it is to process before transmission by second-multiplexer switching stage 40; and likewise is rendered non-conductive before corresponding first-multi-plexer switching stage 28 is rendered non-conductive. Upon termination of this integration, the integral signal thus far developed at the output of first integrator 66–68 is persistently held.

Then, during the next cycle of operating of counter 43, the processed signal from the second photodiode 10 is integrated by second integrator 86–88 and, at the end of this integration, the integral signal developed at the output of second integrator 86–88 likewise persistently held.

During the next-following cycle of operation of counter 43, the processed signal derived from first photodiode 9 is again applied to first integrator 66–68, and thus integration of the signal derived from first photodiode 9 continues.

And so forth.

In this way, the first and second integral signals developed at the outputs of first and second integrators 66–68 and 86–88 build up stepwise, of course having magnitudes dependent upon the intensity of infrared radiation incident upon their respective photodiodes 9 and 10. Subjecting the processed signals derived from the two photodiodes 9, 10 to integration very considerably improves the signal-to-noise ratio of the signals thusly obtained, i.e., yields light-dependent integral signals which are much more exclusively dependent upon the information of actual interest, and much less dependent upon photodiode and other noise, than are the signals produced at the two outputs of second multiplexer 39.

The integral signal at the output of one or the other or both of the first and second integrators 66–68, 86–88 thus builds up stepwise, increasing by one step during each alternate operating cycle of counter 43, and the number of integrations performed by the integrator before its output signal reaches the threshold voltage level of its associated voltage comparator 69–72 or 89–92 will depend upon the amplitude of the processed photodiode signal being integrated.

Assuming, for explanatory purposes, that the threshold level of first voltage comparator 69–72 is reached first, a "1" signal is applied to the upper input of associated AND-gate 74. In general, a "1" signal is present at the lower inputs of the two AND-gates 74, 95, applied thereto from the output of inverter 100, because the signal at output Qn of tolerance-range counter 85 will in general be a "0", i.e., except at those times when tolerance-range counter 85 has begun to count and has furthermore reached a predetermined count at which a "1" signal appears at its output Qn. Accordingly, the "1" signal applied by first voltage comparator 69–72 to the upper input of AND-gate 74 produces a "1" signal at the output of that gate, which in turn is transmitted to the clock input of associated D-flip-flop 75, as a result of which flip-flop 75 becomes set, i.e., a "1" signal appears at its Q-output. This "1" signal is transmitted to the associated input of OR-gate 98, producing a "1" signal at the output of gate 98 and thereby at the upper input of AND-gate 99. The lower input of AND-gate 99 will be in receipt of a "1" signal because, as already indicated, a "1" signal will in general be present on the output of inverter 100. The first "1" signal to be produced at the output of AND-gate 99 is produced as soon as a "1" signal is received at its middle input, via terminal F, from the Q-output of D-flip-flop 45. As already explained, a "1" signal appears at the Q-output of D-flip-flop 45 during every alternate counting cycle of counter 43, in particular during those counting cycles of counter 43 in which the signal transmission path from second photodiode 10 is rendered conductive. The first "1" signal thusly produced at the output of AND-gate 99 is applied to the counting input of tolerance-range counter 85, and initiates counting by the latter. Thus, tolerance-range counter 85 receives its first input pulse during one of the second operating cycles of counter 43, i.e., during a cycle in which the transmission path from second photodiode 10 is rendered conductive, and thereafter each subsequent input pulse, likewise, during each successive second (alternate) operating cycle of counter 43. Until counter 85 reaches a predetermined count, a "0" signal continues to be present at its output Qn, and accordingly a "1" signal continues to be applied from the output of inverter 100 to the lower input of AND-gate 99 (so that counting by tolerance-range counter 85 can continue) and to the lower inputs of the two AND-gates 74, 95 (so that signals produced at the outputs of the two voltage comparators 69–72, 89–92 can continue to be transmitted to the circuit stages connected to their outputs).

As already explained, if the camera's state of focus is perfect, then nominally the reflected-back infrared beam will be incident on the two photodiodes 9, 10 exactly equally. If the state of focus is greatly off, the reflected back beam will be incident exclusively on one or the other of the photodiodes 9, 10, depending upon the sense of the state-of-focus error. If the state of focus is off but not greatly off, a greater part of the reflected-back beam will be incident on one photodiode 9, 10 than on the other, which one depending, again, on the sense of the state-of-focus error.

For explanatory purposes, assume that the state of focus is slightly in error, but to so small an extent that corrective action is not warranted, and with the sense of the error such that the reflected-back infrared beam is to a greater extent incident on photodiode 9 than on photodiode 10, although incident on both.

The appearance of a "1" signal at the output of first integrator 69–72, attributable to the incidence of the reflected-back beam on first photodiode 9, has already been mentioned. As also stated already, this has required a number of integrations performed by first integrator 69–72 determined by the fraction of the reflected-back beam incident on associated photodiode 9, and tolerance-range counter 85, as already stated, has commenced counting after the appearance of this voltage-comparator output signal, and is presently in the process of counting.

Meanwhile, because a fraction of the reflected-back beam is incident on second photodiode 10 also, and the light-dependent integral signal at the output of second integrator 86–88 has meanwhile been undergoing a similar stepwise build-up, more slowly building up to the threshold voltage level of second voltage comparator 89–92, due to the lesser fraction of the reflected-back beam incident on second photodiode 10. In such a situation, the integral signal at the output of second integrator 96–88 would, ultimately, reach the threshold level of second voltage comparator 89–92, i.e., after the tripping of first voltage comparator 69–72 by a time interval whose duration is determined by the amount of the small state-of-focus error. This occurs, and a "1" signal appears at the output of second voltage comparator 89–92.

For explanatory purposes, it is assumed that the amount of the state-of-focus error is not merely smaller than would warrant corrective action, but just slightly smaller than a value which would warrant corrective action. Subsequent to the appearance of a "1" signal at the output of first voltage comparator 69–72, and during the continued build up of the integral signal at the output of second integrator 86–88 towards the threshold level of second comparator 89–92, counting by tolerance-range counter 85 has been continuing. Just slightly after the appearance of a "1" signal at the output of second comparator 89–92, tolerance-range counter 85 reaches the count at which a "1" signal appears at its output Qn. As a result, a "0" signal appears at the output of inverter 100, thereby disabling AND-gate 100 and terminating further counting by counter 100, and furthermore disabling both AND-gates 74, 95, to prevent further transmission of output "1" signals from the first and second voltage comparators 69–72, 89–92 to their respective D-flip-flops 75, 96. Because the amount of the state-of-focus error is assumed to be just slightly below a value warranting corrective action, the "1" signal produced at the output of second voltage comparator 89–92 will have been transmitted to the clock input of associated D-flip-flop 96, causing a "1" signal to appear at the Q-output of the latter, just previous to the disablement of the two AND-gates 75, 96. Accordingly, in this situation, subsequent to the disablement of the two AND-gates 75, 96, the Q-outputs of both flip-flops 75, 96 are carrying "1" signals, just as if the reflected-back infrared beam had been incident on the two photodiodes 9, 10 to perfectly equal extents.

(If the state-of-focus error had been of the same sense, but of an amount just slightly greater than the value which begins to warrant corrective action, then the "1" signal produced at the output of second voltage comparator 89-92 would have appeared just slightly after the two AND-gates 74, 95 were disabled, with the result that, after disablement of these two gates, only flip-flop 75 would have a "1" signal at its Q-output. Accordingly, the duration of the counting cycle of tolerance-range counter 85 serves to define the amount of state-of-focus error below which corrective action is not, and above which corrective action is, to be permitted. This serves to take into account the fact that, as a practical matter, the two processed signals derived from the two photodiodes 9, 10 may not be perfectly equal even when the camera's state-of-focus happens to be exactly perfect).

The state-of-focus data needed for system operation has now been produced, and is held by the two D-flip-flops 75, 96.

Thereafter, a "1" signal appears at output Qm of cycle counter 83. This "1" signal is applied, without delay, to the clock inputs of D-flip flops 84 and 97, as a result of which these two flip-flops assume the states of respective ones of the two D-flip-flops 75 and 96. Shortly thereafter, the "1" signal produced at output Qm of cycle counter 83, i.e., delayed by an interval associated with the intermediate point (output of gate 76) of time-delay chain 76-81, is applied to the reset inputs R of the two D-flip-flops 75, 76, resetting these two flip-flops (i.e., causing a "0" signal to appear at their Q-outputs), to ready these two flip-flops for the next time the required state-of-focus data is to be established. Additionally, this delayed version of the "1" signal produced at output Qm of cycle counter 83 is applied to the bases of the two transistors 73, 93, rendering these conductive, thereby discharging the integrating capacitors 67, 87, and thus resetting the first and second integrators 66-68, 86-88. The same signal is applied to the reset input R of tolerance-range counter 85, resetting the latter; counting by counter 85 has already terminated, due to the "0" signal at the output of inverter 100, and counting by counter 85 does not now resume, despite the appearance of a "1" signal at the output of inverter 100, because of the presence of "0" signals at both inputs of OR-gate 98, keeping AND-gate 99 disabled.

Thus, if the camera's state of focus is exactly correct, equal fractions of the received reflected-back beam are incident on the two photodetectors 9, 10, the Q-output of flip-flop 84 carries a "1" signal, and the Q-output of flip-flop 97 carries a "1" signal. These same states are assumed by the two flip-flops 84, 87 if the fractions of light incident on the two photodetectors 9, 10 are not equal, but their difference corresponds to the magnitude of the tolerance range established by tolerance-range counter 85.

If the present subject-distance setting of the camera's objective is too long, then the Q-output of flip-flop 84 carries a "1" signal, and the $\overline{Q}$-output of flip-flop 97 carries a "1" signal.

If the present subject-distance setting of the camera's objective is too short, then the $\overline{Q}$-output of flip-flop 84 carries a "1" signal, and the Q-output of flip-flop 97 carries a "1" signal.

Figure 2:
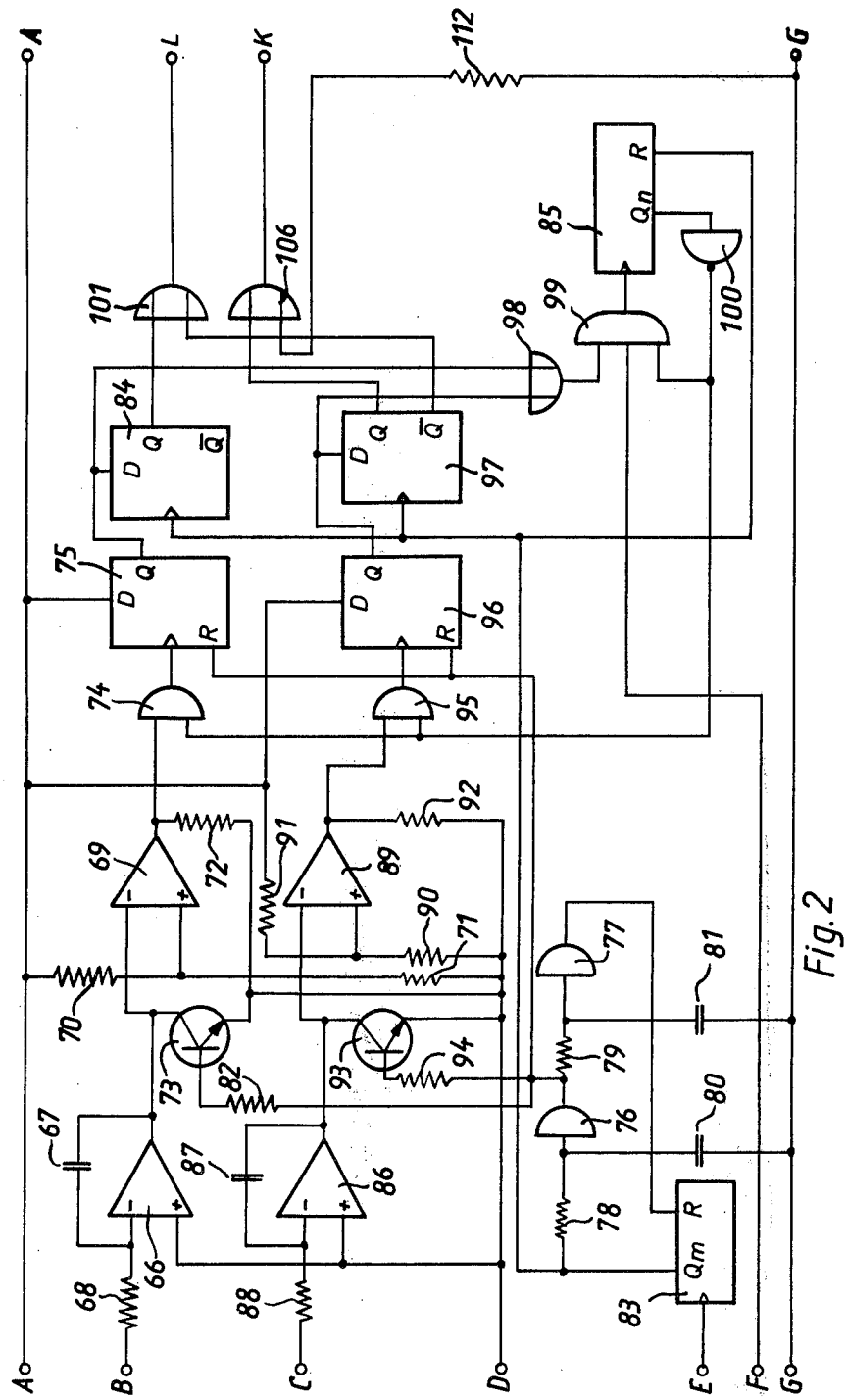

(The circuitry of FIGS. 1 and 2 could be used to drive a bidirectional adjusting motor, or to light up one or the other of two indicators to inform the user that he should turn the camera's focus adjuster ring in one or the other of two directions, although the present invention makes use of this circuit for unidirectional control).

The cycle counter 83 determines how often a generation of focus-control data is to be performed, and how often the focus-control data held on the outputs of flip-flops 84, 97 and AND-gates 101, 106 is to be updated. The counting input of cycle counter 83 is connected, via terminal E and through the intermediary of adjustable time-delay stage 48-50, to the output of AND-gate 51, and accordingly counts the selfsame pulses actually effecting energization of infrared-emissive transmitter diode 57, but receives these pulses delayed by the same interval as involved in the activation of alternate switching stages in second multiplexer 39, i.e., due to the fact that the output of time-delay stage 48-50 is connected to the right inputs of the AND-gates 46, 47 which control the changes of state of the switching stages 40, 41 within second multiplexer 39. The duration of the complete counting cycle of cycle counter 83, resulting in the ultimate appearance of a "1" signal at the output Qm of cycle counter 83, is long enough to assure that at least one of the two voltage comparators 69-72, 89-92 is tripped, if the true camera-to-subject distance is within the operative range of the focussing system. At the end of the counting cycle of cycle counter 83, and after termination of the "1" signal at its output Qm, the integrations begin anew, in order to generate new or updated focus-control data.

In the illustrated embodiment, the power of the electrical signals produced by the photodetector arrangement 9, 10 is automatically regulated by negative-feedback action, and tends to remain relatively constant, at least for short camera-to-subject distances, due to automatic control of the level of radiant power emitted from transmitter diode 57. As a result, when the camera's state of focus error (whether or not actually acceptable) is low enough that the reflected-back beam is partly incident on each of the two photodiodes 9, 10, the time interval elapsing between the tripping of one of the two voltage comparators 69-72, 89-92 and the tripping of the other is rather directly correlatable with the true magnitude of the state-of-focus error. Accordingly, the maximum acceptable value for the amount of the focus error can, as shown, be implemented using a tolerance-range counter 85 whose counting cycle is of fixed duration.

However, if the power level of the received-back radiation is not thusly subjected to negative-feedback regulation, the time elapsing between tripping of one of the two voltage comparators 69-72, 89-92 and the tripping of the other ceases to be so directly correlatable with the true magnitude of the focus error, because it becomes highly dependent upon the magnitude of the true camera-to-subject distance per se, i.e., irrespective of whether the focus error per se is zero or considerably higher. This tends to reduce the definiteness of the tolerance range established by a tolerance-range counter of fixed counting-cycle duration. In that event, the counting-cycle duration of the tolerance-range counter can be made inversely related to the power level of the signal developed by the photodetector arrangements 9, 10. For example, instead of developing a signal inversely related to the output signal of amplifier 36 and using it to control the emitted-power level, such a signal can be developed, applied to an analog-to-digital converter, and in digital form be applied to a tolerance-range counter to establish the count which the tolerance-range counter must reach before a "1" signal appears on its Qn output.

In the illustrated embodiment, the output of OR-gate 106 is connected to a terminal K, but terminal K is not actually used for anything. The output of OR-gate 101 is connected via a terminal L to the clock-signal input T of a D-flip-flop 109 (see FIG. 3). The D-input of flip-flop 109 is connected to the positive operating voltage line A. The $\overline{Q}$-output of flip-flop 109 is connected via a resistor 102 to the base of a transistor 103 in whose collector circuit is connected an electromagnet 104. Electromagnet 104 is furthermore connected in circuit with a zener diode 105 connected across the collector-emitter path of transistor 103. The reset input R of D-flip-flop 109 is connected via an inverter 107 to the output of a time-delay stage comprised of a capacitor 111 and two resistors 108, 110, the input of time-delay stage 108, 110, 111 being connected to the positive operating voltage line A. When power-connect switch 2 (FIG. 1) is open, time-delay capacitor 111 is in discharged condition. When switch 2 is closed, a "1" signal is applied to the R-input of flip-flop 107, thereby rendering transistor 103 conductive and energizing electromagnet 104, this "1" signal lasting for a short time interval determined by time-delay stage 108, 110, 111. When this "1" signal terminates, the D-input of flip-flop 109 will be in receipt of a "1" signal, but flip-flop 109 does not actually assume set state in response thereto, until a clock signal is received at its T-input from the output of OR-gate 101.

Figure 3:
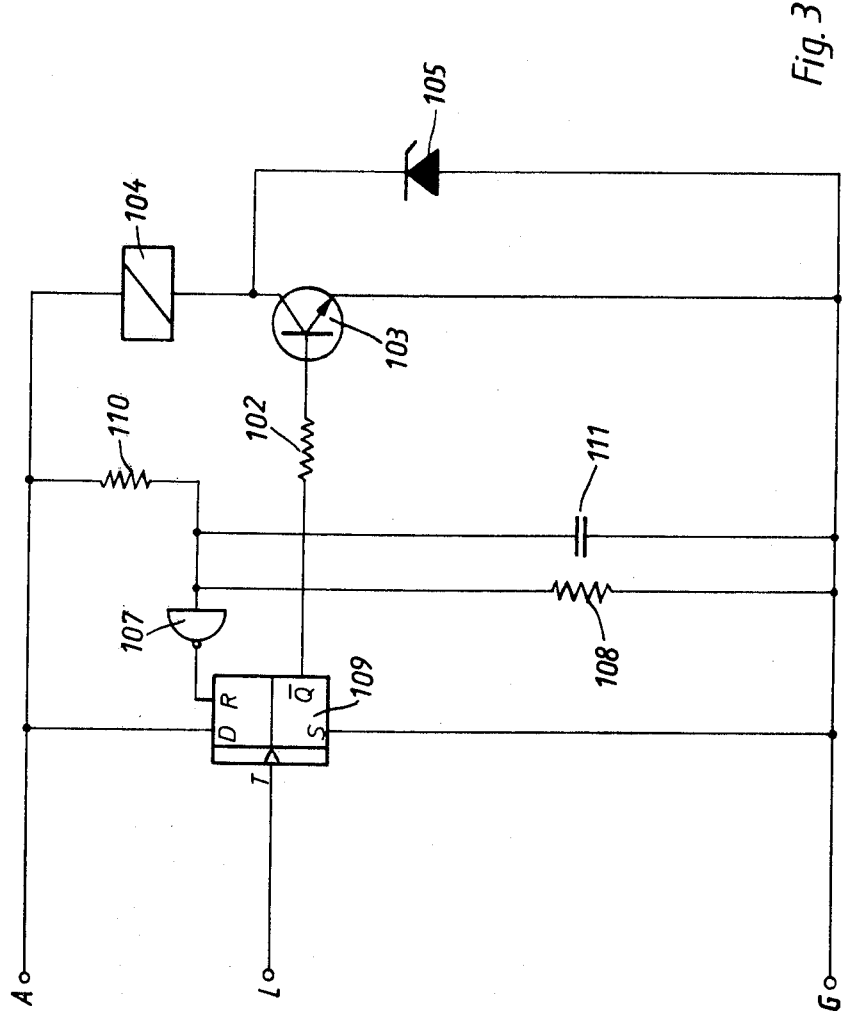
FIG. 3 depicts additional circuitry, cooperating with that of FIGS. 1 and 2, for implementing unidirectional control action.
Figure 4:
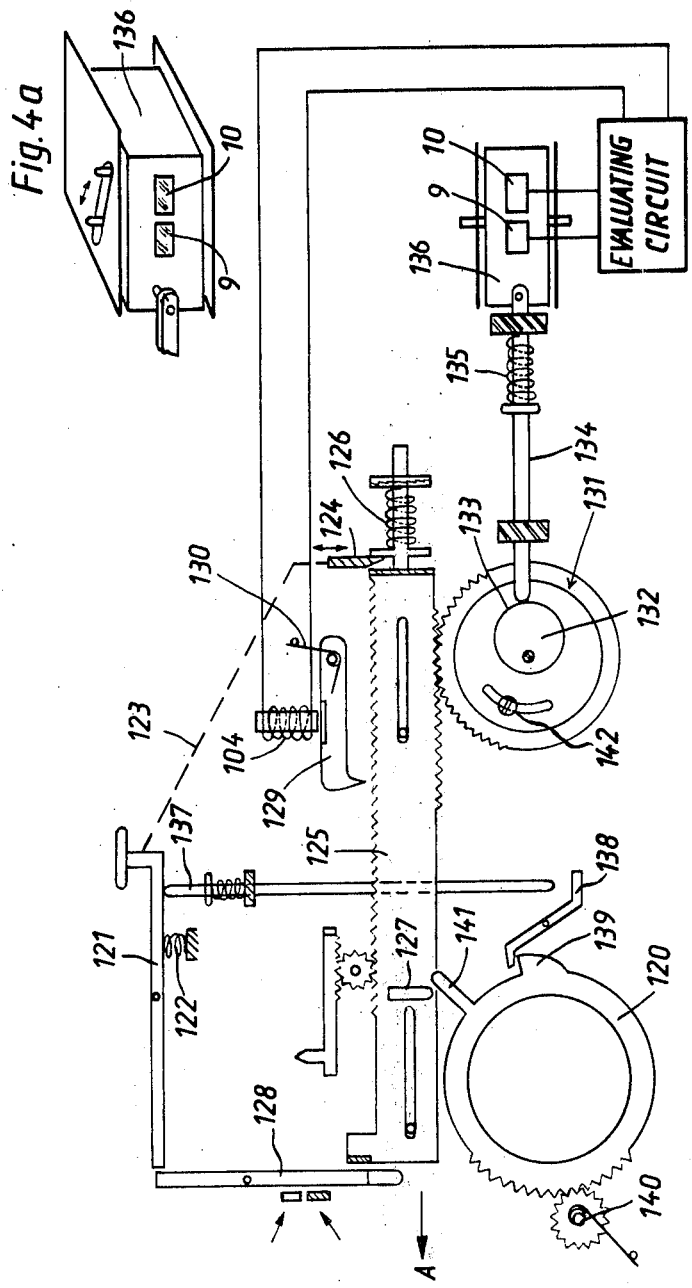
FIG. 4 schematically depicts the mechanical components of one exemplary unidirectional focussing system.

The evaluating circuitry of FIGS. 1–3, and in particular the two photodetectors 9, 10 and the electromagnet 104 thereof, cooperate with mechanical components depicted in FIG. 4. Numeral 121 denotes a release lever, which the user activates to initiate an exposure, or for example a series of exposures in the case of a motion-picture camera. Lever 121 is depressed against the action of a biasing or return spring 122. Release lever 121 is coupled, via a schematically represented mechanical coupling 123, to a detent member 124. Detent member is normally operative for latching a control slide 125 in the illustrated setting thereof. When release lever 121 is depressed, detent member 124 unlatches control slide 125, and a drive spring 126 drives slide 125 leftwards from its illustrated setting. Slide 125 is provided with a projection 127 and incidentally cooperates with a cocking member 128. Control slide 125 is toothed at its upper edge and can be arrested at any longitudinally displaced position by a detent member 129, the latter constituting the armature of electromagnet 104. A spring 130 urges detent 129 into arresting engagement with the teeth of slide 125, but when electromagnet 104 is energized detent 129 is held away from slide 125 as shown in FIG. 4. Slide 125 is provided with toothing at its lower edge and there engages the toothed periphery of an adjuster disk 131 provided with an eccentric cam 132 having a discamming surface 133. Camming surface 133 is tracked by a sliding-rod cam follower 134, the latter being pressed into engagement with camming surface 133 by means of a compression spring 135. The right end of sliding rod 134 is coupled to a carrier element 136 on which the two photodetectors 9, 10 already referred to are mounted. Accordingly, carrier element 136 and the photodetectors 9, 10 carried thereon are displaced in accordance with the longitudinal displacement of sliding-rod cam follower 134.

When release lever 121 is depressed it downwardly displaces a rod 137 which in turn pivots a lever 138 clockwise. Lever 138 in its illustrated position prevents counterclockwise rotation of an objective drive ring 120 coupled to the camera objective. Rotation of objective drive ring 120 changes the subject-distance setting of the objective. When lever 138 unblocks a projection 139 on objective drive ring 120, ring 120 is driven counterclockwise by a spring drive mechanism 140.

When release lever 121 is depressed, control slide 125 flies leftward, displacing the photodetectors 9, 10, until electromagnet 104 is deenergized, whereupon slide 125 is arrested in a position cooresponding to the requisite subject-distance setting. When release lever 121 is depressed somewhat further, lever 138 moves to unblocking position, and objective drive ring 120 is driven counterclockwise until its projection 141 comes to a stop against the projection 127 on slide 125. After performance of an exposure, the slide 125 and objective drive ring 120 are returned to starting position, e.g., driven by a manually powered or motorized film-transport mechanism, or the like. Thus, at the start of each focussing operation, both the adjusting disk 131 and the objective drive ring 120 are in settings corresponding to one extreme of the range of subject-distance settings which the camera objective can assume. In the illustrated embodiment, the camera's subject distance setting is always at a minimum value, e.g., 1 meter, at the start of each focussing operation. A pin-and-slot coupling with a lock screw 142 is provided, so that the angular position of cam 132 relative to the toothing of adjusting disk 131 can be adjusted, to take into account the mechanical time delay elapsing between, on the one hand, generation of a signal commanding deenergization of electromagnet 104, and, on the other hand, the moment at which slider 125 actually comes to a halt.

Figure 5:
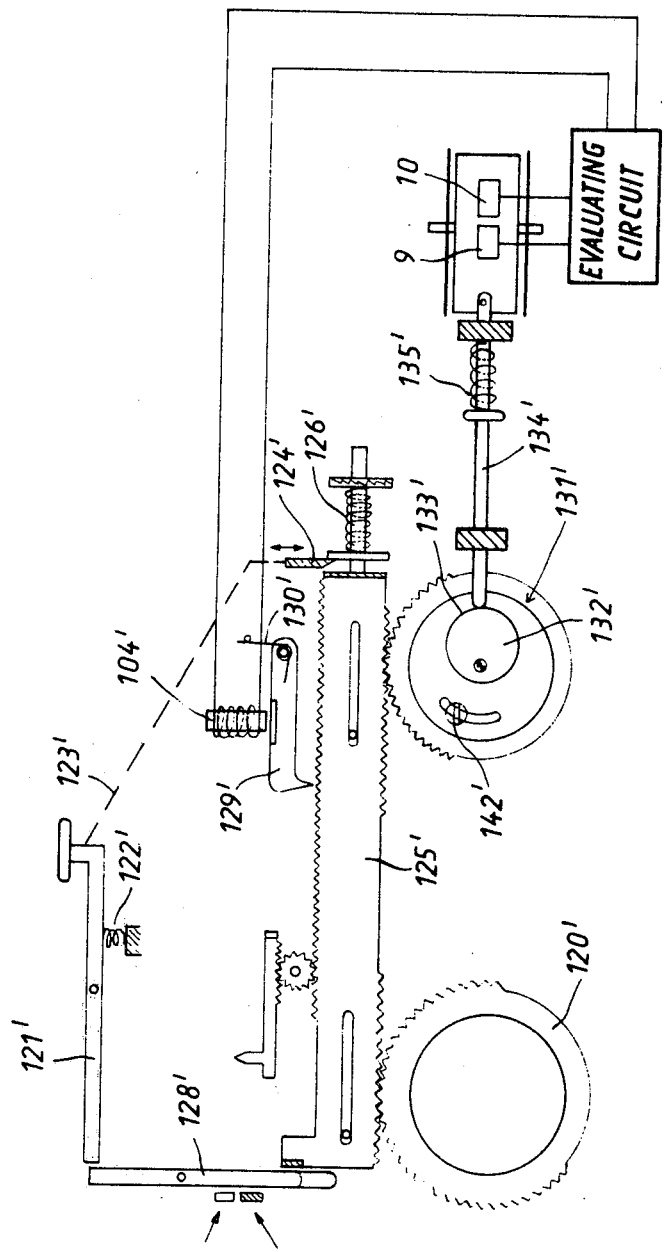
FIG. 5 schematically depicts the mechanical components of another exemplary unidirectional focussing system.

FIG. 5 depicts a modification of the mechanical system of FIG. 4, corresponding parts being denoted by the same reference numerals as in FIG. 4 but primed. In the system of FIG. 5, the objective drive ring 120' is toothed and meshes with toothing on slider 125'. Accordingly, at the instant that slider 125 is arrested due to deenergization of electromagnet 104', the camera objective will be at the subject-distance setting to be used.

Figure 6:
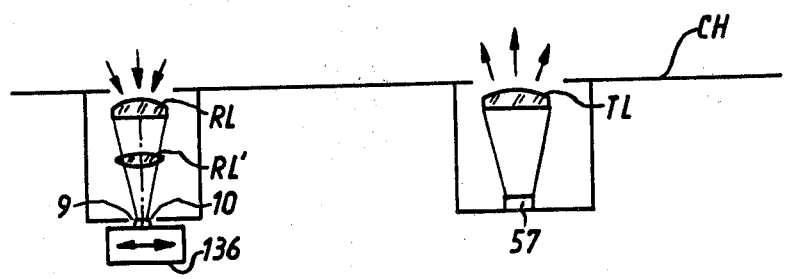
FIG. 6 schematically depicts by way of example the optical part of one exemplary bidirectional control circuit employed in accordance with the invention.

FIG. 6 depicts part of the camera housing CH. Housing CH has a first recess in which is located the infrared-emissive diode 57 of FIG. 1. A convergent transmitter lens TL concentrates the infrared radiation emitted towards the subject to be photographed. Camera housing CH includes a further recess in which are positioned the two photodetectors 9, 10. A convergent receiver lens RL collects the radiation reflected back from the subject and transmits it via an an optics RL' onto the two photodetectors 9, 10. As already indicated the two photodetectors 9, 10 are mounted on a carrier element 136 which is displaced in correspondence to the displaced position of slide 125 during a focussing operation. If the subject-distance setting to which the displaced position of slide 125 at any given moment corresponds equals the true camera-to-subject distance, infrared light is incident on the two photodetectors 9, 10 equally. If the subject-distance setting is too short, then the infrared light is incident more on or exclusively on one of the two photodetectors, if too long then incident more on or exclusively on the other of the two photodetectors.

As shown in FIG. 4a, photodetector carrier element 136 can be so mounted that, in response to lengthwise displacement of sliding-rod cam follower 134, it move both towards or away from optics RL' and also laterally of optics RL'. This has the advantage that, if the present subject-distance setting of the camera in fact corresponds to the true camera-to-subject distance, the infrared light spot will not only be incident equally on the two photodetectors 9, 10 but furthermore be projected onto them in focus. Alternatively, as schematically indicated in FIG. 6, the photodetector carrier element 136 can, more simply, be mounted for simple lateral shifting movement; the advantage of this alternative is that the coupling to rod 134 can be made simpler and less subject to mechanical wear. Persons skilled in the art will understand that rod 134, instead of thusly displacing the photodetectors 9, 10, could equivalently displace the optics RL'.

In operation, release lever 121 is depressed, and slider 125 moves leftward at high speed, the camera objective changing in setting from its initial minimum-distance (e.g., 1-meter) setting towards infinity setting, with the relative positions of the photodetector pair 9, 10 and cooperating optics RL' changing in correspondence to this progressive change of subject-distance setting. As this occurs, the evaluating circuitry of FIGS. 1 and 2 repeatedly compares the amounts of light incident upon the two photodetectors 9, 10.

Initially, with the camera objective still at minimum subject-distance setting, the subject-distance setting will in general be too short. As a consequence, a "1" signal will be present on the Q-output of flip-flop 97, and a "1" signal on the $\overline{Q}$-output of flip-flop 84. Accordingly, flip-flop 84 will be carrying a "1" signal on its $\overline{Q}$-output, and energized electromagnet 104 will remain energized.

Eventually, as the correct subject-distance setting is reached, the fraction of light incident on photodetector 9, although smaller than that incident on photodetector 10, will differ therefrom by an amount smaller than the tolerance range established by tolerance-range counter 85. As a result, a "1" signal will appear at the Q-output of flip-flop 84 and at the output of OR-gate 101. This "1" signal is applied to the clock input T of flip-flop 109, and a "0" signal appears at the $\overline{Q}$-output of the latter, rendering transistor 103 nonconductive and thereby deenergizing electromagnet 104.

Actually, as the subject-distance setting progresses from minimum to maximum, a "1" signal is produced at the output of OR-gate 106 and a "0" signal at the output of OR-gate 101 until the distance setting, although somewhat shorter than perfect, just passes into the tolerance range; then a "1" signal is produced at the outputs of both OR-gates 101, 106, with the subject-distance setting within the tolerance range; if the subject-distance setting could be increased beyond that, then as it left the tolerance range a "1" signal would be produced only at the output of OR-gate 101. Accordingly, if the circuitry of FIGS. 1 and 2 were used in conjunction with a bidirectional focussing system, not a unidirectional system as here, OR-gate 101 and flip-flop 84 would constitute the output stages associated with a signal commanding that the subject-distance setting be changed (here, made shorter) in the direction which is opposite to the direction (here, from shorter to longer subject-distance settings) in which the unidirectional focussing system to the embodiment illustrated herein operates. In the illustrated embodiment, the output terminal K of OR-gate 106 is left unconnected to other circuitry and not used.

In the illustrated embodiment, the focussing system is powered by a unidirectional adjusting motor, and in particular a spring motor. However, the invention is likewise applicable to systems provided with a bidirectional adjusting motor, e.g., a reversible electric motor. In such systems, it may be of advantage that, at the conclusion of each exposure, the camera objective be automatically returned to an extreme setting, e.g., minimum subject-distance setting; in that event, the focussing system, although potentially bidirectional, will in fact operate unidirectionally, and therefore make appropriate use of the present invention. Likewise, even in those focussing systems where displacement of the camera objective is performed manually, it may be of advantage that, at the conclusion of each exposure or series of exposures, the objective be automatically returned to minimum subject-distance setting, e.g., to inherently reduce the amount of emitted radiant power consumed during the course of the average focussing operation. In that event, operation again becomes essentially unidirectional, and the present invention becomes applicable. For example, instead of using the output signal of OR-gate 101 to arrest the subject-distance adjustment, it could be used to trigger an indicator, to inform the user that he should cease to turn the focus adjuster ring of the camera; an advantage of such a unidirectional manual approach is that it discourages users from becoming involved in perfectionistic hunting routines of a character not corresponding to the actual distance-resolving power of the electronic focussing system. Furthermore, although the invention has been here illustrated with regard to a particular type of two-photodetector state-of-focus evaluating circuit, other types of photodetector-pair circuits might be involved, e.g., those which include no moving parts whatsoever.

It will be understood that each of the elements described above, or two or more together, may also find a useful application in other types of circuits and constructions differing from the types described above.

While the invention has been illustrated and described as embodied in conjunction with a particular type of focussing operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic-camera focussing system having an objective adjustable in a first direction from a first extreme subject-distance setting to a second extreme subject-distance setting, in combination: first and second photodetector means located to receive light from a subject to be photographed; comparing means for comparing the light incident on the first and second photodetector means and generating in dependence upon the present subject-distance setting of the objective a first signal when the camera-objective subject-distance setting should be changed in the first direction, a second signal when the camera-objective subject-distance setting should be changed in an opposite second direction, and generating both the first and second signals concurrently when the camera-objective subject-distance setting is within a predetermined tolerance range of acceptable error; means constraining the camera objective to be at the first extreme subject-distance setting at the start of a focussing operation, whereby in order to bring the camera objective to the correct subject-distance setting it is necessary that the camera-objective subject-distance setting be changed in the first direction from the first extreme setting towards the second extreme setting thereof; and stop-signal-generating means operative in response to said second signal for generating a stop signal commanding that adjustment of the camera-objective subject-distance setting be stopped, whereby as the subject-distance setting is changed in said first direction from said first extreme setting towards said second extreme setting the stop signal is generated in response to generation of said second signal as the subject-distance setting error just enters into the range of acceptable error.

2. In a focussing system as defined in claim 1, the focussing system furthermore including utilization means activated by the stop signal.

3. In a focussing system as defined in claim 2, the focussing system including drive means for driving the camera objective in the first direction from the first towards the second extreme subject-distance setting, the utilization means comprising means operative for automatically stopping the drive means in response to the stop signal.

4. In a focussing system as defined in claim 1, the stop-signal-generating means comprising a storage circuit stage having an input so connected that in response to said second signal the storage circuit stage assumes a state persistently generating the stop signal.

5. In a focussing system as defined in claim 4, the comparing means including a power-connect switch operative when conductive for energizing the comparing means, the storage circuit stage having inputs so connected that the storage circuit stage assumes a state not producing the stop signal when the power-connect switch becomes conductive and then in response to generation of said second signal assumes the state persistently generating the stop signal.

6. In a focussing system as defined in claim 1, the camera objective being provided with an adjuster mechanism for adjusting subject-distance setting, the first and second photodetector means being provided with cooperating optics for projecting light from the subject onto the first and second photodetector means, the focussing system furthermore including displacing means coupled to the adjuster mechanism for effecting relative displacement between the first and second photodetector means and the cooperating optics in dependence upon the setting of the adjuster mechanism.

7. In a focussing system as defined in claim 6, the displacing means comprising means operative for effective relative displacement between the first and second photodetector means and the cooperating optics in a plane which is normal to the optical axis of the cooperating optics.

8. In a focussing system as defined in claim 6, the displacing means comprising means operative for effecting relative displacement between the first and second photodetector means and the cooperating optics in a plane which is not normal to the optical axis of the cooperating optics, said plane forming an angle with the optical axis of the cooperating optics such that the light from the subject projected onto the first and second photodetector means is projected onto the latter in focus for all relatively displaced positions of the photodetector means and cooperating optics.

9. In a focussing system as defined in claim 1, the camera objective being provided with an adjuster mechanism for adjusting subject-distance setting, the focussing system furthermore being provided with an electromagnetic arresting mechanism operative when activated for arresting the adjuster mechanism, the electromagnetic arresting mechanism being connected to receive the stop signal and being activated by the stop signal.

10. In a focussing system as defined in claim 9, the adjuster mechanism including a control member mounted for movement along a predetermined path with each position along such path corresponding to a respective subject-distance setting and drive means driving the control member from a position corresponding to the first extreme setting towards a position corresponding to the second extreme setting, the arresting means arresting the control member, the adjuster mechanism furthermore including an objective mounting structure mounted movable relative to the control member for moving the objective in said first direction from said first towards said second extreme setting, the control member being so located as to arrest the objective mounting structure at a subject-distance setting corresponding to the position in which the control member is arrested by the electromagnetic arresting means.

11. In a focussing system as defined in claim 10, the control member being a slider provided with a projection located in the path of movement of the objective mounting structure.

12. In a focussing system as defined in claim 10, furthermore including further drive means for driving the objective mounting structure from the first towards the second extreme subject-distance setting.

* * * * *